United States Patent
Fiaschi et al.

(10) Patent No.: US 11,991,075 B2
(45) Date of Patent: May 21, 2024

(54) METHODS, APPARATUS AND MACHINE-READABLE MEDIA RELATED TO ROUTING IN A COMMUNICATION NETWORK

(71) Applicant: Telefonaktiebolaget LM Ericsson (publ), Stockholm (SE)

(72) Inventors: Giovanni Fiaschi, Sollentuna (SE); Yun Lin, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/927,963

(22) PCT Filed: Jun. 4, 2020

(86) PCT No.: PCT/EP2020/065442
§ 371 (c)(1),
(2) Date: Nov. 28, 2022

(87) PCT Pub. No.: WO2021/244743
PCT Pub. Date: Dec. 9, 2021

(65) Prior Publication Data
US 2023/0216787 A1    Jul. 6, 2023

(51) Int. Cl.
*H04L 45/42* (2022.01)
*H04L 45/00* (2022.01)
*H04L 45/24* (2022.01)

(52) U.S. Cl.
CPC .............. *H04L 45/42* (2013.01); *H04L 45/24* (2013.01); *H04L 45/38* (2013.01)

(58) Field of Classification Search
CPC .......... H04L 45/42; H04L 45/24; H04L 45/38
(Continued)

(56) References Cited

U.S. PATENT DOCUMENTS 7,346,056 B2 * 3/2008 Devi ..................... H04L 45/302
370/392
10,516,608 B2 * 12/2019 Biancaniello ........... H04L 45/74
(Continued)

FOREIGN PATENT DOCUMENTS

EP      3364611 A1 * 8/2018     ............. H04L 45/00
EP      3364611 A1    8/2018

OTHER PUBLICATIONS

International Search Report and Written Opinion dated Aug. 17, 2020 for International Application No. PCT/EP2020/065442 filed Jun. 4, 2020, consisting of 10—pages.
(Continued)

*Primary Examiner* — Tauqir Hussain
(74) *Attorney, Agent, or Firm* — Weisberg I.P. Law, P.A.

(57) ABSTRACT

A method performed by a network controller for a mobile transport network. The method includes: obtaining traffic information for a plurality of demands for connectivity from client nodes through the mobile transport network, the traffic information for each demand identifying a client node for the demand, an egress node for the demand and an amount of traffic for the demand; calculating, for each demand, one or more paths from the client node, via an ingress node, to the egress node through the mobile transport network; mapping each path for a demand to a source port in the ingress node for the demand; providing the mapping to the ingress nodes to enable routing of traffic pertaining to the demands via the paths, based on the source port; and providing the source ports to the client nodes for inclusion in traffic pertaining to the demands.

14 Claims, 8 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 11,063,842 | B1* | 7/2021 | Vasseur | H04L 12/4633 |
| 11,381,474 | B1* | 7/2022 | Kumar | H04L 41/0896 |
| 11,743,154 | B2* | 8/2023 | Zhang | H04L 43/062 |
| | | | | 709/224 |
| 2003/0227924 | A1* | 12/2003 | Kodialam | H04L 45/38 |
| | | | | 370/395.21 |
| 2012/0089713 | A1* | 4/2012 | Carriere | H04L 61/5014 |
| | | | | 709/222 |
| 2013/0279503 | A1* | 10/2013 | Chiabaut | H04L 45/44 |
| | | | | 370/389 |
| 2013/0298201 | A1* | 11/2013 | Aravindakshan | H04L 69/164 |
| | | | | 726/4 |
| 2014/0092736 | A1* | 4/2014 | Baillargeon | H04L 43/08 |
| | | | | 370/252 |
| 2016/0191194 | A1* | 6/2016 | Wood | H04J 14/0267 |
| | | | | 398/58 |
| 2016/0191370 | A1* | 6/2016 | Wood | H04L 41/12 |
| | | | | 370/238 |
| 2017/0331694 | A1* | 11/2017 | Crickett | H04L 41/0836 |
| 2018/0184311 | A1* | 6/2018 | Fiaschi | H04W 28/0289 |
| 2020/0314022 | A1* | 10/2020 | Vasseur | H04L 41/147 |
| 2020/0342346 | A1* | 10/2020 | Wulff | H04L 12/4633 |
| 2020/0351172 | A1* | 11/2020 | Vasseur | H04L 45/22 |
| 2020/0389390 | A1* | 12/2020 | Vasseur | G06N 20/00 |
| 2021/0029021 | A1* | 1/2021 | Torvi | G06F 16/2379 |
| 2021/0329069 | A1* | 10/2021 | Desmouceaux | H04L 67/146 |
| 2022/0210080 | A1* | 6/2022 | Nagarajan | H04L 47/2483 |

OTHER PUBLICATIONS

3GPP TS 29.281 V16.0.0; 3rd Generation Partnership Project; Technical Specification Group Core Network and Terminals; General Packet Radio System (GPRS) Tunnelling Protocol User Plane (GTPv1-U) (Release 16); Dec. 2019, consisting of 33—pages.

3GPP TS 23.401 V16.5.0; 3rd Generation Partnership Project; Technical Specification Group Services and System Aspects; General Packet Radio System (GPRS) enhancements for Evolved Universal Terrestrial Radio Access Network (E-UTRAN) access (Release 16); Dec. 2019, consisting of 436—pages.

Kumar, Praveen et al.; Semi-Oblivious Traffic Engineering: The Road Not Taken; Proceedings of the 15th USENIX Conference on Networked Systems Design and Implementation, 2018, consisting of 15—pages.

Racke, Harald; Optimal Hierarchical Decompositions for Congestion Minimization in Networks; 40th STOC; 2008, consisting of 9—pages.

Coffman, E.G et al.; Approximation Algorithms for bin-Packing—An Updated Survey; Algorithm Design for Computer System Design, Springer, 1984, consisting of 58—pages.

* cited by examiner

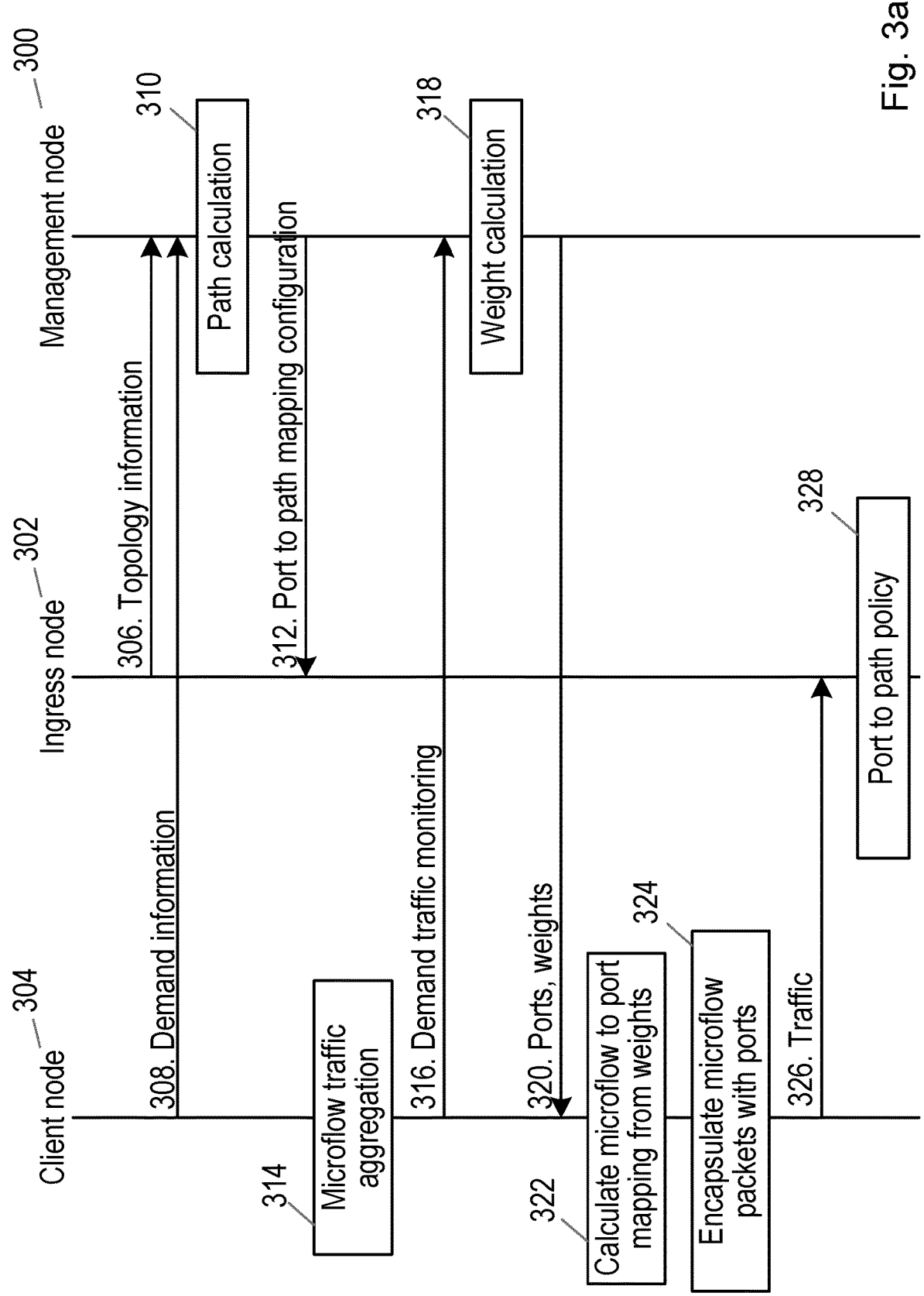

METHODS, APPARATUS AND MACHINE-READABLE MEDIA RELATED TO ROUTING IN A COMMUNICATION NETWORK

CROSS-REFERENCE TO RELATED APPLICATION

This application is a Submission Under 35 U.S.C. § 371 for U.S. National Stage Patent Application of International Application Number: PCT/EP2020/065442, filed Jun. 4, 2020 entitled "METHODS, APPARATUS AND MACHINE-READABLE MEDIA RELATED TO ROUTING IN A COMMUNICATION NETWORK," the entirety of which is incorporated herein by reference.

TECHNICAL FIELD

Embodiments of the disclosure relate to communication networks, and particularly to methods, apparatus and machine-readable media relating to routing traffic in a communication network.

BACKGROUND

In present-day radio access networks (RAN), the user data is collected via radio base stations (e.g., eNodeBs, gNodeBs, etc.) and then sent via transport networks towards the core network nodes. Such transport networks are commonly referred to as mobile backhauling networks (MBH) or mobile transport networks.

The MBH network implements an Internet Protocol (IP) packet transport service for the RAN, referred to as IP transport network layers (IP TNL). The main interfaces used to transport user traffic between the RAN and core network nodes are implemented with the GTPv1-U protocol (general packet radio services tunneling protocol, version 1, user data) defined in 3GPP TS 29.281, v 16.0.0.

The GTPv1-U protocol stack multiplexes several user tunnels onto the same interface. The GTP protocol defines Tunnel Endpoint Identifiers (TEID), one for each user tunnel, carrying user IP data. The GTP protocol itself is in turn carried over user datagram protocol (UDP) packets. A GTP-U tunnel is identified in each node with a TEID, an IP address and a UDP port number. Common practice is to use a single GTP-U tunnel UDP port for the entire GTP-U traffic from a radio base station. The UDP is in turn carried by IP packets.

The problem of traffic routing in a network has been the subject of research for many years, and involves selecting a path for traffic in a network. Routing is performed for many types of networks, including circuit-switched networks and packet-switched networks. Conventional approaches to routing generally involve the assessment of multiple possible paths between two nodes of the network (e.g. an ingress or source node and an egress or destination node), and the selection of one particular path for the traffic based on some metric or cost criteria. For example, the shortest path may be selected, or the path leading to minimal cost.

However, this approach may not always lead to the optimal solution for the traffic, or for the network as a whole. For example, a demand for connectivity may specify one or more constraints to be satisfied by the network (e.g., a maximum latency). If a particular path satisfies the constraints, it may be beneficial for the network to allocate traffic to the particular path even if the path is not otherwise "optimal" in the sense of being shortest, minimal cost etc.

WO2020/088780 addresses this problem by calculating multiple paths for a particular traffic flow, and allocating traffic to those paths in varying weights so as to achieve a particular overall result. However, this application does not describe a mechanism for allocating traffic to a given path in accordance with those weights.

SUMMARY

According to a first aspect there is provided a method performed by a network controller for a mobile transport network. The method comprises: obtaining traffic information for a plurality of demands for connectivity from client nodes through the mobile transport network, the traffic information for each demand identifying a client node for the demand, an egress node for the demand and an amount of traffic for the demand; calculating, for each demand, one or more paths from the client node, via an ingress node, to the egress node through the mobile transport network; mapping each path for a demand to a source port in the ingress node for the demand; providing the mapping to the ingress nodes to enable routing of traffic pertaining to the demands via the paths, based on the source port; and providing the source ports to the client nodes for inclusion in traffic pertaining to the demands.

Apparatus and machine-readable media for performing the method set out above are also provided. For example, in another aspect there is provided a network controller for a mobile transport network. The network controller comprises processing circuitry and a non-transitory machine-readable medium storing instructions which, when executed by the processing circuitry, cause the network controller to: obtain traffic information for a plurality of demands for connectivity from client nodes through the mobile transport network, the traffic information for each demand identifying a client node for the demand, an egress node for the demand and an amount of traffic for the demand; calculate, for each demand, one or more paths from the client node, via an ingress node, to the egress node through the mobile transport network; map each path for a demand to a source port in the ingress node for the demand; provide the mapping to the ingress nodes to enable routing of traffic pertaining to the demands via the paths, based on the source port; and provide the source ports to the client nodes for inclusion in traffic pertaining to the demands.

In another aspect, a non-transitory machine-readable medium stores instructions which, when executed by processing circuitry of a network controller, cause the network controller to: obtain traffic information for a plurality of demands for connectivity from client nodes through the mobile transport network, the traffic information for each demand identifying a client node for the demand, an egress node for the demand and an amount of traffic for the demand; calculate, for each demand, one or more paths from the client node, via an ingress node, to the egress node through the mobile transport network; map each path for a demand to a source port in the ingress node for the demand; provide the mapping to the ingress nodes to enable routing of traffic pertaining to the demands via the paths, based on the source port; and provide the source ports to the client nodes for inclusion in traffic pertaining to the demands.

BRIEF DESCRIPTION OF THE DRAWINGS

For a better understanding of examples of the present disclosure, and to show more clearly how the examples may be carried into effect, reference will now be made, by way of example only, to the following drawings in which:

FIGS. 3a and 3b are signalling diagrams according to embodiments of the disclosure;

DETAILED DESCRIPTION

Figure 1:
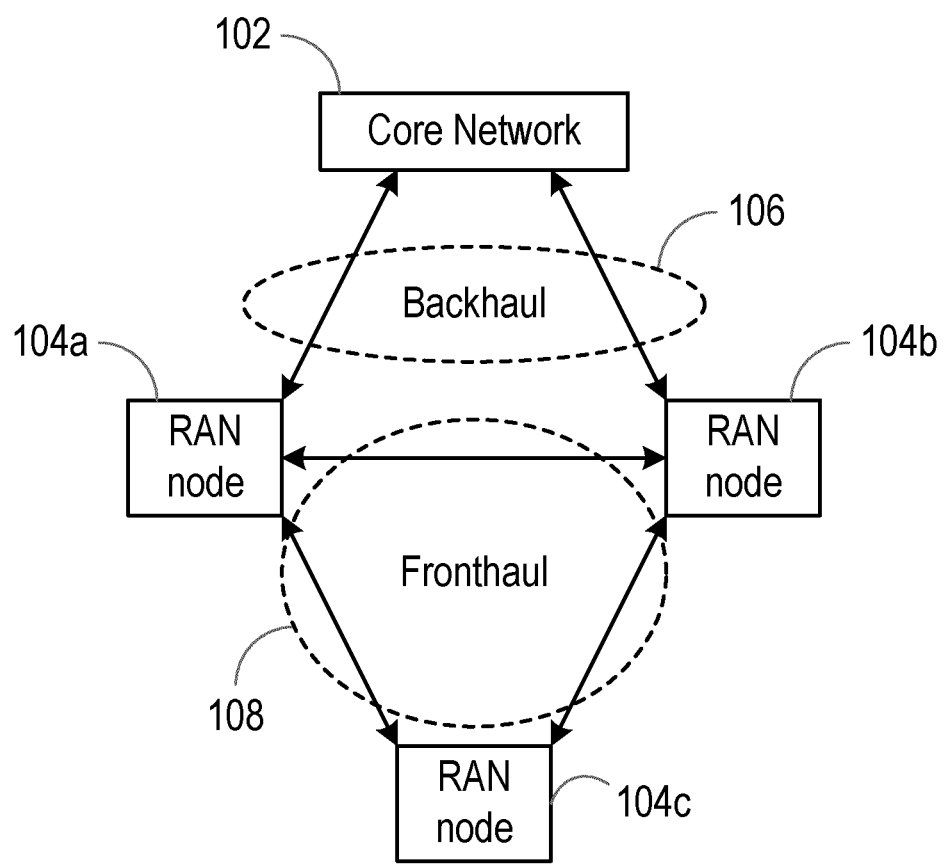
FIG. 1 is a schematic diagram of a telecommunications network.

FIG. 1 shows a telecommunications network 100 in which embodiments of the disclosure may be implemented according to one example.

The network 100 may implement any suitable standard for the provision of radio communications. For example, the network 100 may implement a cellular telecommunications standard, such as those which have been developed, or are being developed, or will be developed, by the $3^{rd}$ Generation Partnership Project (3GPP). Such standards include Global System for Mobile Communications (GSM) including General Packet Radio Service (GPRS) and Enhanced Data Rates for GSM Evolution (EDGE), Universal Mobile Telecommunications Systems (UMTS) including High Speed Packet Access (HSPA), Long Term Evolution (LTE) including LTE Advanced and LTE Advanced Pro, and the fifth generation (5G) standard currently under development, New Radio (NR).

The network 100 comprises a core network 102 and a radio access network (RAN) comprising a plurality of RAN nodes 104a, 104b, 104c (collectively 104). One or more of the RAN nodes 104 are connected to the core network 102 via a backhaul network 106. The RAN nodes 104 are connected to each other via a fronthaul network 108. Aspects of the disclosure may apply to any part of a telecommunications network.

The RAN nodes 104 may comprise base stations, nodeBs, eNodeBs or gNodeBs (the latter being the nomenclature currently used in the developing 5G standard). It will further be appreciated by those skilled in the art that the functions of RAN nodes may be distributed across multiple entities and/or multiple sites. Not all of those entities may have connectivity to the core network 102. For example, the functions of a RAN node may be distributed between a central unit (CU), one or more distributed units (DUs) and one or more Radio Units (RUs).

The fronthaul network 108 thus provides connectivity between nodes 104 of the radio access network. Such connectivity may be required in multiple scenarios. For example, while in a dual connectivity mode, a user equipment (UE) may have multiple connections to RAN nodes 104 active at the same time (e.g. multiple DUs and/or multiple base stations). Close co-ordination may be required between the RAN nodes 104 to prevent collision of transmissions to the UE, duplication of transmissions, etc. In other examples, the functions of RAN nodes may be distributed or split across multiple entities or sites, with the fronthaul network 108 providing connectivity between those distributed entities and/or sites.

The nature of traffic allocated to the fronthaul network 108 may therefore have the following characteristics:

It requires very strict latency constraints (e.g., tens of microseconds); and

Traffic from different users is prone to collision.

The first of these characteristics restricts the number of paths which satisfy the latency constraint. If a path through the fronthaul network 108 does not satisfy the latency constraint, it cannot be considered as an option for providing the requested connectivity. This may simplify the complexity of the route calculation problem.

The second of these characteristics may make it advantageous for traffic to be distributed across multiple paths, rather than allocated to a single "best" path. In the latter case, collision between traffic may result in significant degradation to the network performance, as the entire traffic for a particular demand is affected by the collision. If the traffic is distributed over multiple paths, a collision on any one of those paths is less likely and network performance is improved. At least some of the same characteristics are applicable to further parts of the network 100.

Figure 2:
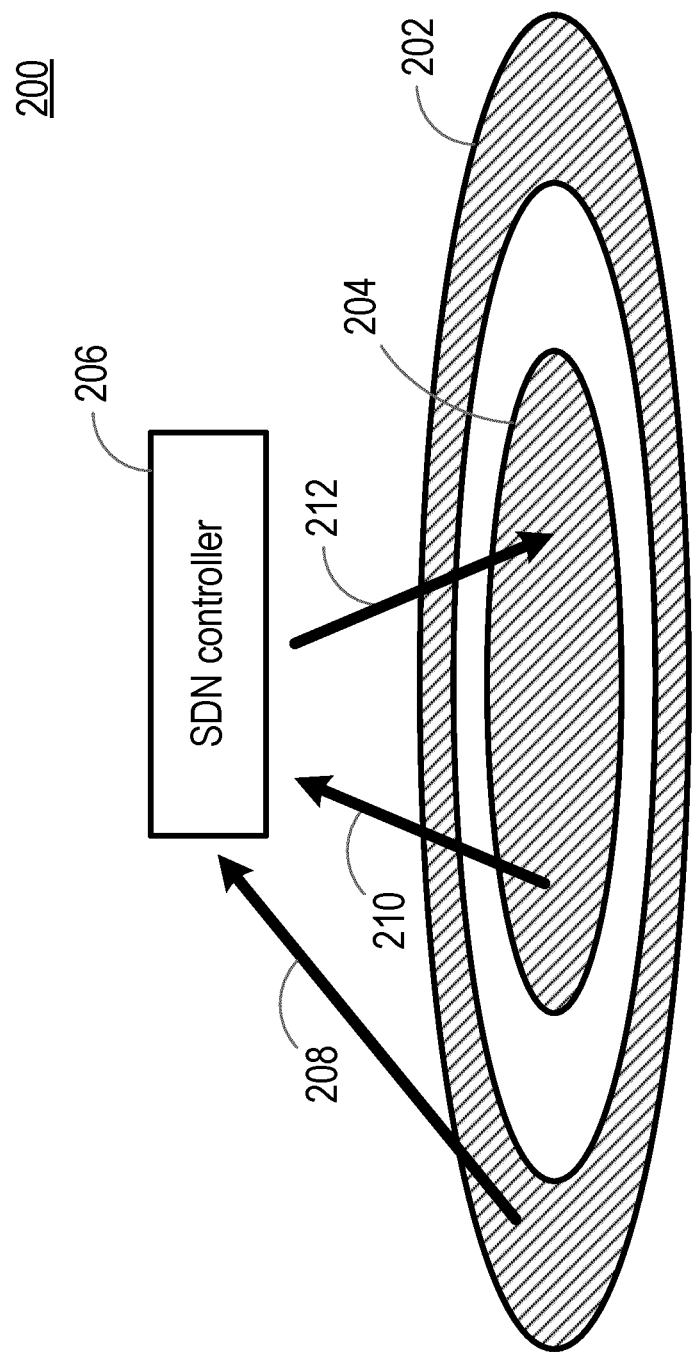
FIG. 2 is a schematic diagram of a traffic allocation system according to embodiments of the disclosure.

FIG. 2 is a schematic diagram of a traffic allocation system 200 according to embodiments of the disclosure. The system 200 comprises a client network 202 and a transport network 204 providing connectivity for the client network 202. In one particular embodiment, the client network 202 may comprise a radio access network such as that described above with respect to FIG. 1, while the transport network 204 may comprise the fronthaul network 108. However, in other embodiments, the embodiments of the disclosure may allocate traffic for any telecommunications network. One particular embodiment provides a backhaul network between a radio access network and a core network for a mobile communication network.

The transport network 204 comprises a plurality of nodes coupled to each other via respective links. A node may be connected to any number of other nodes of the network 204. In one example, the transport network 204 may utilize optical communication techniques, with the nodes comprising optical switches or other hardware and the links comprising optical links such as optical fibres. In another example, the transport network uses wireless microwave transmission.

A management node 206 for the system 200 is communicatively coupled to both the client network 202 and the transport network 204. The management node 206 may be a software defined networking (SDN) controller or SDN function, for example. The management node 206 is operative to receive connectivity demands from the client network 202, and allocate traffic for those connectivity demands to one or more paths through the transport network 204. Further detail is provided below.

In step 210, the management node 206 obtains topology information for the transport network 204. For example, the topology information may comprise one or more of: identities of a plurality of nodes in the network; an indication of the links between respective pairs of the plurality of nodes (e.g., an indication as to which node identities are connected to which other node identities); an indication of the penalty associated with each link and/or node (e.g. latency); and an indication of the capacity of each link and/or node. The topology information may be visualized as a graph of nodes interconnected by links.

The management node 206 may further obtain, in step 210, an indication of the traffic usage over each link of the transport network 204. Note that the traffic usage over each link will be a sum of the traffic from all paths through the network 204 which utilize that link.

In step 208, the management node 206 obtains, from the client network 202, a plurality of demands for connectivity between nodes of the client network 202 or between attachment points of the transport network. Thus each connectivity demand may comprise identities of a first node (e.g. a source or ingress node) and a second node (e.g., a destination or egress node), with traffic to be routed between those nodes via the transport network 204.

Each connectivity demand may further specify one or more constraints to be satisfied by the routing through the transport network 204. For example, the connectivity demand may specify a maximum latency to be associated with the routing. In this case, the constraint is satisfied by a particular path through the network 204 if the total latency of the path is less than the maximum latency. In examples where the transport network 204 comprises a fronthaul network (such as the network 108 described above with respect to FIG. 1), the maximum latency may be relatively short, e.g., tens of microseconds. In this context, the constraint may be specified by the user or client associated with the connectivity demand. In other embodiments, each connectivity demand may alternatively or additionally be associated with a constraint which is specified by an operator of the transport network 204.

For example, although optical fibres provide an excellent transmission medium with high bandwidth, optical signals will generally deteriorate as they cross optical links (e.g. fibres) and nodes (e.g. switches) owing to various effects such as group velocity dispersion, fibre loss, adjacent channel cross-talk, self phase modulation, etc. Eventually the optical signals may degrade to the point where they are unreadable. Where the transport network 204 comprises optical links and optical nodes, therefore, it may be beneficial to limit the light path length and convert the optical signals to electrical signals at certain points (before onward transmission as optical signals). A constraint may be associated with each connectivity demand defining a maximum light path length through the network before optical-to-electrical conversion.

Conversely, optical-to-electrical conversion is associated with increased cost in operating the transport network 204 (e.g. through the necessity of providing electro-optic converters, etc.) and reduced capacity in the transport network (as the electro-optic converters may become bottlenecks for traffic passing through the network). A constraint may therefore be associated with each connectivity demand limiting the number of electro-optic converters in each path. For example, the constraint may define a maximum number of electro-optic converters per unit length within the path.

Further examples of possible constraints comprise a maximum number of crossed nodes within the path (e.g., to limit node resource usage or to limit the path length for path computation purposes), and a maximum number of segments used to express the path routing (e.g. after label stack optimization in a Segment Routing network). The latter constraint may be applicable particularly if the nodes or routers in the path have a limitation as to the label stack depth they are capable of processing.

Each connectivity demand may further be associated with or comprise an indication of the traffic usage for that connectivity demand (e.g., an amount of traffic which is to use the connectivity). For example, the traffic usage per demand may be measured by the client or the management node 206 where paths for the connectivity demand have already been established for a period of time (e.g. when the process described herein is used to update existing traffic allocations). The traffic usage may be an average of the traffic usage measured over a particular time window, for example. Thus, the management node may additionally receive in step 208 an indication of a measured amount of traffic flowing for each connectivity demand.

In step 212, the management node computes one or more paths satisfying the constraints for each connectivity demand, and determines weights according to which traffic for each connectivity demand should be allocated to each of the computed paths. Some embodiments of the disclosure provide for updating of the weights according to which traffic for each connectivity demand is allocated to each of the computed paths.

In addition, according to embodiments of the disclosure, each path for a demand is mapped to a source port in the first node (e.g., the ingress node of the transport network 204). In one embodiment, the source port is a UDP source port. In other embodiments, the source port is a transmission control protocol (TCP) source port.

The paths and their respective source ports are provided to the transport network 204, and particularly to the first nodes (e.g., the source or ingress nodes). Providing the paths to the transport network enables those paths to be established in the network. In a first embodiment, the source ports and the respective weights for the paths corresponding to the source ports are provided to the client nodes (e.g., the radio access network nodes). Providing the weights to the client nodes enables the client nodes to assign traffic to particular paths in accordance with the weights. In a second embodiment, the management node 206 utilizes the weights itself to assign flows (or microflows) of traffic to a particular source port (and therefore a particular path). In this case, the management node 206 provides the mapping between flows and source ports to the client nodes. In either case, the source ports act as a label for the path which is visible to the transport layer (i.e., the first nodes in the transport network 204). In the first embodiment, a client node allocates traffic for a demand to the paths for that demand, as labelled by the respective source ports, and in accordance with the weights received from the management node. The traffic transmitted by the client nodes is further adapted to include the source port, such that the source port acts as a routing identifier and is independent of an actual source port. On receipt of such traffic from a client node, the first node (e.g., ingress node) in the transport network can immediately transmit the traffic over the path in accordance with the source port included in the traffic, based on the mapping received from the management node. In the second embodiment, the client node transmits traffic flows to the transport network 204 without itself allocating those flows to a path, but nonetheless including the source port as a routing identifier according to the mapping provided by the management node 206. Again, the first node (e.g., ingress node) in the transport network 204 is able to transmit the traffic over the path in accordance with the source port included in the traffic. Further detail regarding this and other aspects of the disclosure is provided below with respect to FIGS. 3 to 5.

FIG. 3a is a signalling diagram according to embodiments of the disclosure, between a management node (such as the SDN controller or SDN function described above) 300, an ingress node 302 of a transport network (such as the transport networks 106, 108, 204 described above), and a client node 304 (such as a radio access network node).

In step 306, the management node 300 communicates with the transport network (shown illustratively in FIG. 3a as communication with the ingress node 302) to obtain topology information for the transport network. This step may be substantially similar to step 210 described above.

In step 308, the management node 300 receives demand information from the client node 304. This step may be substantially similar to step 208 described above.

In step 310, the management node calculates one or more paths for each demand. Further detail regarding this step may be found in step 404 below.

In step 312, the management node maps each path to a corresponding source port in the ingress node 302, and provides the paths and their source port mapping to the ingress node 302. For example, the source port may be a UDP source port or a TCP source port. The source port is not conventionally used in routing traffic over a transport network, but is visible to transport-layer routers. Thus the source port offers a convenient and efficient mechanism for labelling a path and allowing traffic to be allocated to that path by the client node. The ingress node is thus enabled to establish the paths in the transport network, and stores the mapping between source ports and corresponding paths.

In steps 314 and 316, the client node 304 aggregates and monitors traffic flow which has the same ingress and egress nodes in the transport network (and thus corresponds to a "demand"), and transmits the measured amount of traffic to the management node 300. In one embodiment, the traffic is configured as a plurality of microflows (corresponding to individual user traffic), and thus a plurality of microflows are aggregated to form each demand.

In step 318, the management node assigns weights to each path for a demand. Further detail regarding this step may be found in step 406 and in FIG. 5 below.

In step 320, the management node 300 provides the source ports and the weights to the client node 304. Note that the paths themselves do not need to be provided to the client node, as the implementation of the paths takes place in the transport network. The source port acts as a label for each path, however, and thus the weights associated with each path by the management node 300 may instead be associated with the source port by the client node 304. In this way, the client node 304 is enabled to allocate traffic to a given path without knowing what that path actually is.

In step 322, the client node 304 has user traffic to transmit to the ingress node, for onward transmission over the transport network. The client node must therefore allocate the traffic to a particular path, based on the weights provided by the management node.

Here it is recalled that the traffic is defined as belonging to a "demand", characterized by two endpoints and an amount of traffic. The traffic belonging to a demand may be configured such that it can be arbitrarily split amongst the various paths (represented by source ports) according to the weights. For example, for a given demand d having total aggregate traffic $T_d$, the nth path is allocated $w_n T_d$ traffic, where $w_n$ is the weight associated with the nth path.

In other embodiments, however, the traffic for a particular demand may comprise a plurality of "microflows" which are indivisible. For example, each microflow may relate to traffic for a single user device. In this case, the aggregate traffic for a demand is calculated by summing the traffic amount of all the microflows between the same endpoints.

In this case, if it is desired to transmit $w_n T_d$ over the nth path, the amount of traffic $w_n T_d$ must be approximated with a sum of microflows. Each microflow will typically represent a different amount of traffic, and therefore an allocation heuristics is needed. This problem can be analogized to the "bin packing problem", where items of different volumes must be packed into a finite number of bins of different sizes. Those skilled in the art will appreciate that there are numerous approaches to this problem and the present disclosure is not limited in this respect. One simple approach involves allocating the largest unallocated microflow to the path having the largest amount of unused capacity. Other approaches include next-fit, next-k-fit, first-fit, best-fit, worst-fit, first-fit decreasing etc.

In one embodiment, tunnels may be established by the client node 304 using a network tunnelling protocol (such as GTP) for transmission of the user data to the transport network 204 according to the paths. In this case, the client node 304 may store a mapping between the source port and an identifier for the network tunnel, such as a tunnel endpoint identifier (TEID).

Thus the traffic is allocated to a particular path in accordance with the weights received in step 320. In step 324, the corresponding source port for that path is added to the traffic, and in step 326 the traffic is then transmitted to the ingress node 302 for onward transmission over the transport network.

In step 328, the ingress node receives the traffic and reads the source port. Based on the mapping received in step 312, the ingress node 302 translates the source port to its corresponding path, and transmits the traffic over the path. As the source port can be read at the transport layer, the traffic does not require decapsulation to be forwarded over its corresponding path. Further, the client node does not need to have any knowledge of the paths over which the traffic is transmitted.

Figure 3B:
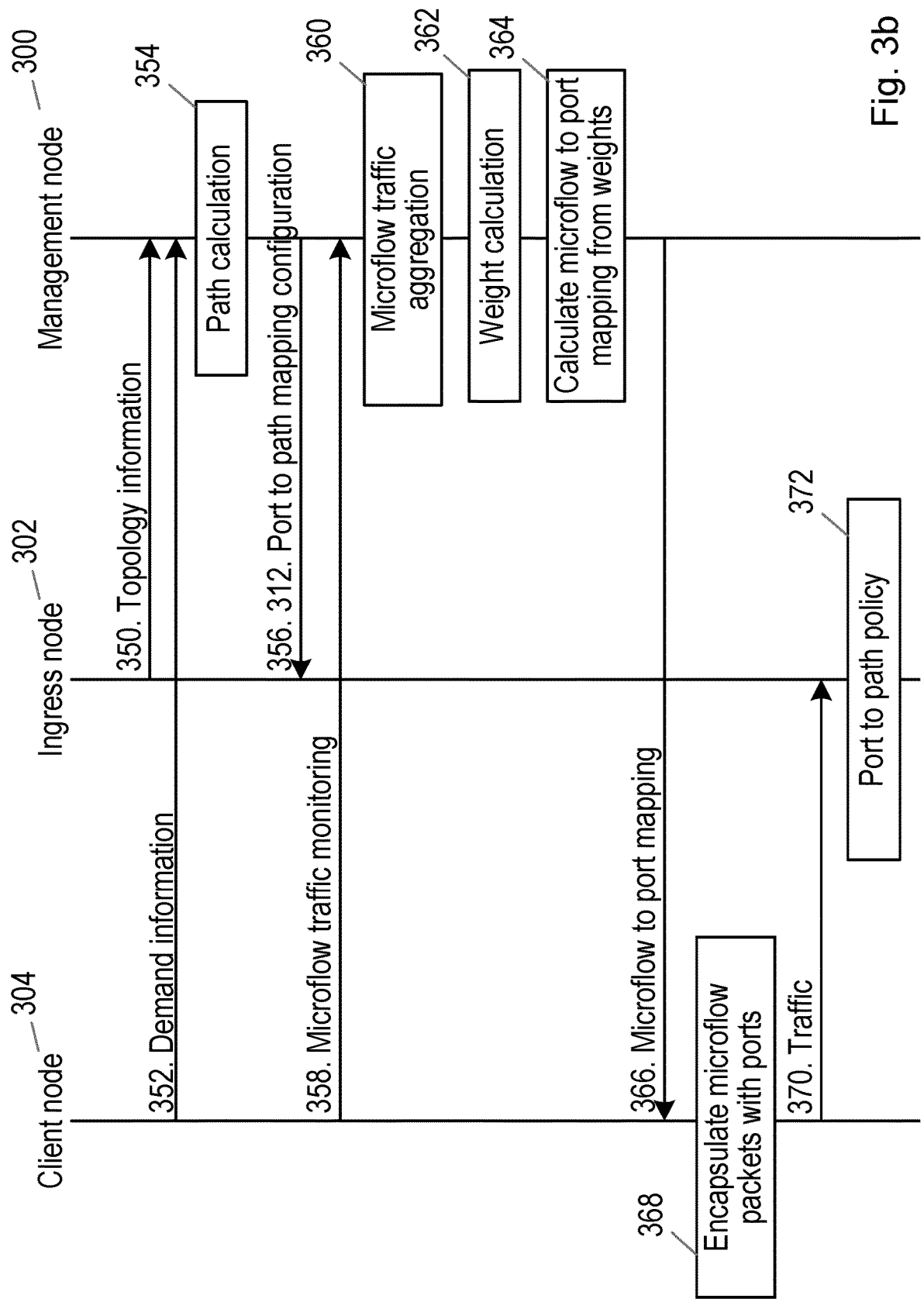

FIG. 3b is a signaling diagram according to further embodiments of the disclosure. To a large extent, the entities and steps of the signalling are similar to that described above with respect to FIG. 3a. Therefore signalling is again shown between a management node (such as the SDN controller or SDN function described above) 300, an ingress node 302 of a transport network (such as the transport networks 106, 108, 204 described above), and a client node 304 (such as a radio access network node).

The signalling in FIG. 3b differs in that it is the management node 300 which maps traffic to paths in accordance with the weights, and not the client node 304. The allocation may be performed in a substantially similar way to that described above with respect to FIG. 3a, however. Thus, instead of providing the weights to the client node 304, the management node 300 provides a mapping between traffic flows (e.g., microflows) and source ports (which act as labels for the paths). The client node 304 then transmits the microflows to the ingress node 302, including the relevant source port according to the mapping, and this is used by the ingress node 302 to transmit the microflow over the assigned path.

Steps 350 to 356 correspond to steps 306 to 312, respectively, and are not described further. Steps 358 and 360 differ from steps 314 and 316 in that it is the management node 300 which aggregates traffic belonging to demands and not the client node 304. Thus in step 358, the client node 304 transmits traffic flow information to the management node 300, enabling the management node 304 to aggregate traffic (and particularly traffic microflows) belonging to the same demand as the client node 304 did in step 316.

In step 362, the management node 304 calculates weights for each path for a demand, similar to step 318 described above. Step 364 is similar to step 322; however, it is the management node which assigns traffic (e.g., microflows) belonging to a demand to a particular path based on the weights. Thus in step 364 the management node 300 maps each microflow to a source port (which acts as a label for a corresponding path). This mapping is provided to the client node 304 in step 366. Steps 368 to 372 correspond to steps 324 to 328, respectively, with the exception that the client node 304 in step 370 adds the corresponding source port to the traffic based on the mapping provided by the management node 304, and not the weights.

Figure 4:
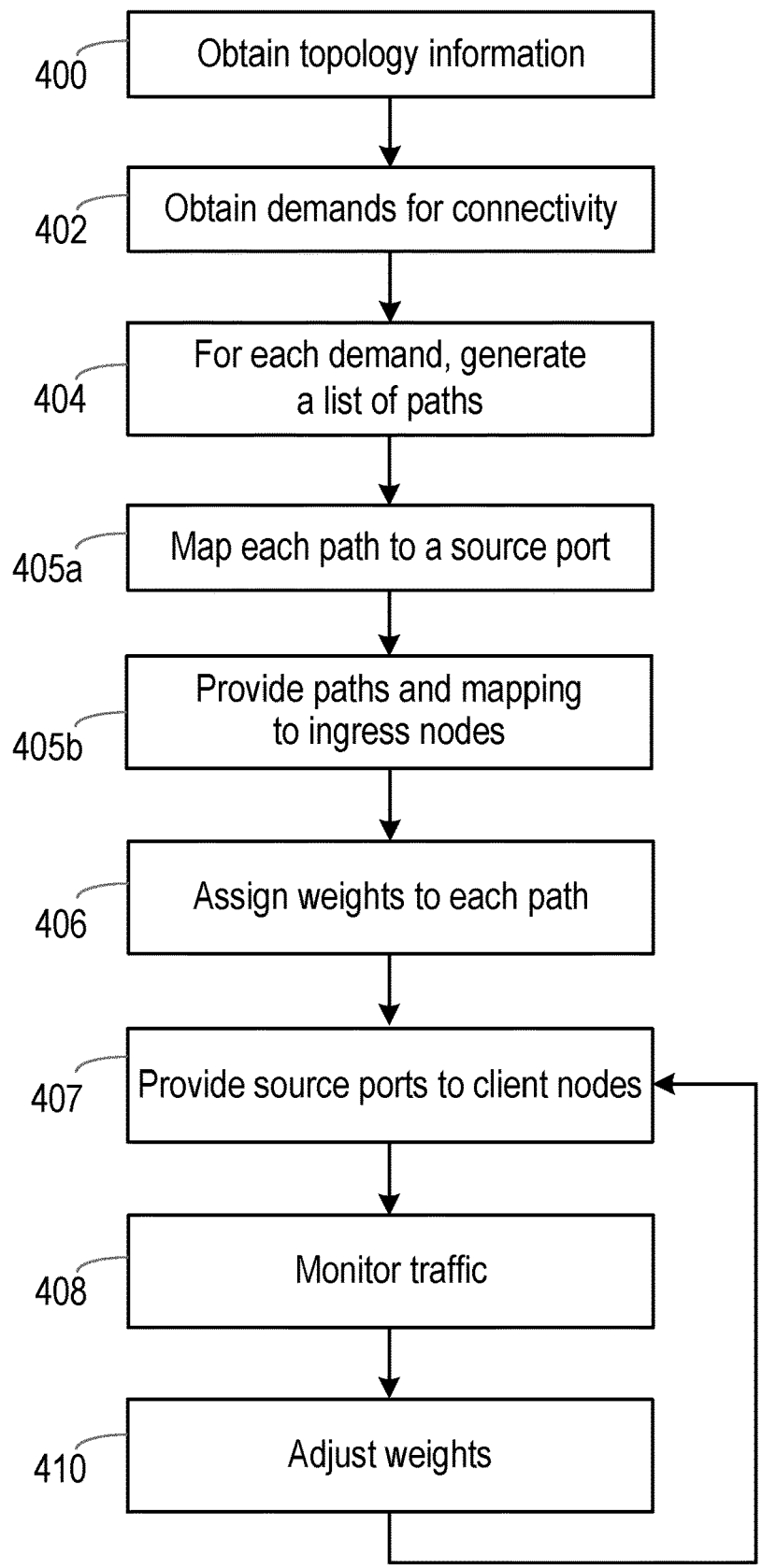
FIG. 4 is a flowchart of a method according to embodiments of the disclosure.

FIG. 4 is a flowchart of a method according to embodiments of the disclosure. The method may be performed in a management node for a telecommunications network, such as the SDN controller 206 described above with respect to FIG. 2.

In step 400, the management node obtains topology information for telecommunications network. This step may be largely similar to step 210 described above. Thus, in one embodiment, the topology information may comprise one or more of: identities of a plurality of nodes in the network; an indication of the links between respective pairs of the plurality of nodes (e.g., an indication as to which node identities are connected to which other node identities); an indication of the penalty associated with each link and/or node (e.g. latency, etc.); and an indication of the capacity of each link and/or node. The management node may obtain such information through communications with the network itself (e.g. via one or more control interfaces between the management node and the network), or through receipt of configuration information from a designer or operator of the network. The topology information may be updated periodically or whenever a change is made to the network topology.

In the following the nodes are indicated with indices. A link connecting node i with node j is indicated with $I_{ij}$.

A link $I_{ij}$ has capacity $c(I_{ij})$, which can be expressed e.g. as its bandwidth in bits per second.

A link $I_{ij}$ has penalty penalty(i), which can be expressed in different units of measure (e.g., seconds or submultiples for time penalties, e.g., delay or latency).

A node i may also have a penalty penalty(i) in the same unity of measure as the link penalty. For example, packets crossing routers may experience some latency.

In this example, the penalty is assumed to be additive, that is to say, the resulting penalty of crossing one or more links and one or more nodes is the sum of their individual penalties. For example, penalties such as latency may be additive. Those skilled in the art will appreciate that different penalties may accumulate in different and/or non-linear ways. For example, optical impairments may accumulate in a non-linear fashion. The present disclosure is not limited in that respect.

In step 402, the management node obtains a plurality of demands for connectivity over the network. This step may be largely similar to step 208 described above. Thus the plurality of demands for connectivity may relate to connectivity between nodes of a client network or between attachment points of a transport network. Each connectivity demand may comprise or be associated with identities of a first node (e.g. a source or ingress node) and a second node (e.g., a destination or egress node), with traffic to be routed between those nodes via the transport network 204. Each connectivity demand may further be associated with one or more constraints to be satisfied by the routing through the telecommunication network (e.g., one or more of the constraints described above), and an indication of traffic usage of the connectivity (e.g., an amount of traffic such as a traffic rate or volume).

The connectivity demand between nodes i and j is indicated with $d_{ij}$. The connectivity demand $d_{ij}$ may be associated with a measured usage $u(d_{ij})$. The connectivity demand $d_{ij}$ may further be associated with a maximum acceptable penalty max_penalty($d_{ij}$) (i.e., a constraint). A path may not be selected for the demand if it exceeds that maximum acceptable penalty.

Connectivity usages need to be comparable among each other (e.g., use the same or similar units), and similarly link capacities need to be comparable among each other. However, it will be understood by those skilled in the art that connectivity usage and link capacity may not need to be directly comparable with each other, i.e. defined using the same or similar units.

The information for a connectivity demand may be sent by a client network to the management node, e.g., as in step 208 described above.

In step 404, the management node generates, for each connectivity demand, a list of possible paths through the telecommunications network from the first node to the second node which satisfy the constraint or constraints (e.g. a maximum latency). In one embodiment, the management node calculates all non-looping paths which satisfy the constraint or constraints.

In this context, a path $p_K(d)$ for demand $d_{ij}$ is defined as the set of adjacent nodes and links it crosses. The penalty of a path is the sum of the penalties of all nodes and links it crosses. $P(d_{ij})$ is the set of paths satisfying the requirements for dy.

There are several possibilities to compute the paths satisfying a certain connectivity demand (the $P(d_{ij})$ set above). Two examples include breadth-first search (BFS) and depth-first search (DFS) algorithms. In the former case, the searching algorithm starts at a tree root (e.g., the first node) and explores neighbor nodes first, before moving to the next level neighbours. In the latter case, the algorithm again starts at a tree root, but explores as far as possible along each branch before backtracking.

However, for large- or medium-sized networks, computing all the feasible paths $P(d_{ij})$ could be prohibitively complex.

The common way of computing paths in a network is by using a shortest path (minimal cost) algorithm. This computes only one path per demand and may easily lead to bottlenecks in case of unbalanced traffic on the demands and/or on the background.

The equal cost multi-path (ECMP) concept is also already used in IP networks. All the paths with minimal cost are used, if there are ties in the minimal cost calculation. While providing some alternatives, the number of paths per demand is not explicitly controllable. This number does not depend on the node distance and may be too low or too high for the network operation needs.

The k-shortest paths is a well-known extension of the shortest path algorithm, which that finds k paths (where k is an integer greater than one) between two nodes with non-increasing cost. Those skilled in the art will appreciate that several algorithms are known for computing the k shortest paths and the present disclosure is not limited in that respect. In one embodiment, the Eppstein algorithm may be used to discover the k shortest paths between a source node and a destination node satisfying a given constraint (e.g., as described in "Finding the k Shortest Paths", by David Eppstein, SIAM Journal on Computing, Volume 28, pp 652-673).

In a further embodiment, paths are calculated according to the methods set out in WO2020/078527, which is incorporated by reference herein. This application sets out methods for calculating a set of paths for transmission of traffic between two nodes of a network, in which the set of paths has a measure of diversity. Thus traffic transmission over paths calculated according to these methods can be expected to be more robust to network faults over single links or single nodes.

It will be noted that, if demands for traffic with different requirements (e.g., different constraints) are sent between the same endpoints, the set of paths for each demand may need to be calculated independently.

Thus the output of step 404 is a set of one or more paths for each connectivity demand, which satisfy the constraint(s) associated with that demand. These paths may be established in the network (e.g., as described above with respect to step 212).

In step 405a, the management node maps each path for each demand to a corresponding source port in the ingress node for that demand. For example, the source port may be a UDP source port or a TCP source port.

In step 405b, the management node provides the paths calculated in 304 and their corresponding source ports to the ingress nodes for each demand. The ingress node is thus enabled to establish the paths in the transport network, and stores the mapping between source ports and corresponding paths.

In step 406, the management node assigns weights, for each demand, for each of the paths in the set (see also step 212 described above). The weight assigned to path $P_k$ is indicated by $w_k$. The sum of all weights for a demand may be constrained as equal to one, such that the traffic for a given demand is distributed over the set of paths found for that demand.

The weights initially assigned to each path for a demand in step 406 may be determined in any suitable manner. Later steps of the method set out a method for monitoring the traffic in the network and adjusting the weights so as to improve network performance. The weights may be adjusted iteratively until an optimal or near-optimal solution is found. Thus the weights which are assigned in step 406 are relatively unimportant and can be arbitrary, except that the closer those initial weights are to the optimal solution, the fewer the number of iterations that will be required when adjusting the weights later in the method.

In one embodiment, the weights for each demand are assigned in step 406 to be equal, such that the traffic for each demand is distributed evenly across each of the paths found for that demand. Alternatively, the weights assigned in step 406 may be determined using more sophisticated techniques, such as those described in PCT application no PCT/EP2017/084207.

In step 407, the management node provides the source ports to the client node for each demand. Note that the paths themselves do not need to be provided to the client node, as the implementation of the paths takes place in the transport network. The source port acts as a label for each path, however.

The management node may additionally provide the weights to the client node in step 407, and thus the weights associated with each path by the management node may instead be associated with the source port by the client node. In this way, the client node is enabled to allocate traffic to a given path without knowing what that path actually is. Alternatively, the management node may itself allocate traffic to a particular path based on the weights calculated in step 306. In this case, the management node may provide the mapping between traffic (e.g., traffic microflows) and source ports (which act as labels for paths).

In one embodiment, tunnels may be established by the client node using a network tunnelling protocol (such as GTP) for transmission of the user data to the transport network according to the paths. In this case, the client node may store a mapping between the source port and an identifier for the network tunnel, such as a tunnel endpoint identifier (TEID).

In step 408, the management node monitors the traffic in the network as a result of the weights assigned in step 406. For example, the traffic associated with each demand may be measured, through communication with the client nodes (see step 210 described above). The traffic flowing in each of the links of the network may also be monitored, through communication with each of the nodes of the network (see step 208 described above). Alternatively, the traffic flowing in each of the links may be calculated, based on the traffic for each of the demands and the weights assigned in step 406. However, this latter approach does not take into account traffic flowing on the network which is outside the control of the management node. For example, the network infrastructure may be utilized by multiple virtual networks, with the management node able to control only the traffic for its respective virtual network. Measuring the traffic flowing in each link allows the traffic allocation strategy set out herein to take this external or "background" traffic into account.

In step 410 (see also step 212 described above), based on the traffic measured in step 408, the weights assigned in step 406 are adjusted so as to improve one or more performance criteria of the network (e.g. load balancing, traffic throughput, etc.). Step 410 may comprise the adjustment of a single pair of weights (e.g., a reduction in the weight for one path of a demand, and a corresponding increase in the weight for another path of the same demand). The method returns to step 407, and the updated weights are provided to the client nodes or, alternatively, the mapping between traffic (e.g. traffic microflows) and source ports is provided to the client nodes. Here it is assumed that no new paths are added based on the monitored traffic levels, and thus it is unnecessary to adjust the mapping between paths and source ports. However, if necessary of course the method may be repeated from the start in order to determine an improved traffic routing using additional or alternative paths. Otherwise, steps 407, 408 and 410 may be repeated iteratively until some stopping criterion is reached.

Figure 5:
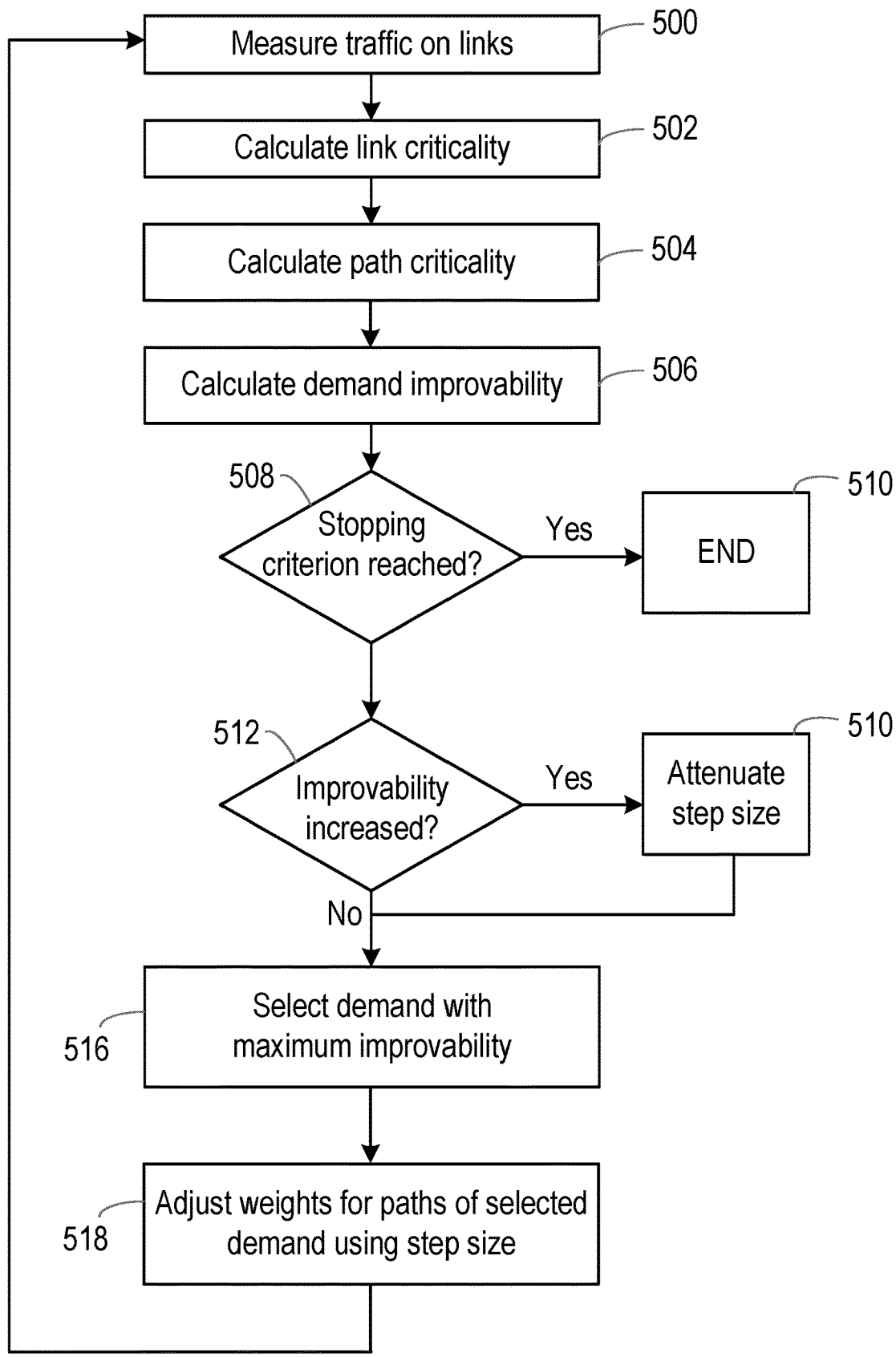
FIG. 5 is a flowchart of a method of adjusting weights according to embodiments of the disclosure.

The weights may be calculated and adjusted in any suitable manner, and those skilled in the art will be aware of several different methods for calculating weights for the purposes of traffic engineering in a transport network. The present disclosure is not limited in that respect. FIG. 5 below sets out one possible example, which introduces the concept of "criticality" of a link in the network. Other examples include that set out in a paper by P. Kumar, Y. Yuan, C. Yu, N. Foster, R. Kleinberg, P. Lapukhov, C. L. Lim, and R. Soule, "Semi-oblivious traffic engineering: The road not taken," in Proceedings of the 15th USENIX Conference on Networked Systems Design and Implementation, ser. NSDI'18. Berkeley, CA, USA: USENIX Association, 2018. ISBN 978-1-931971-43-0 pp. 157-170.

FIG. 5 is a flowchart illustrating in more detail a method of adjusting the weights for distributing traffic over a plurality of paths of a network according to some embodiments of the disclosure. The method may be employed by the management node in steps 408 and 410, described above with respect to FIG. 4.

The method begins in step 500, in which the management node measures the traffic on each of the links in the network. The traffic in each link may be reported directly to the management node by nodes of the network. Alternatively, the traffic in each link may be calculated based on the measured traffic associated with each demand (e.g., as reported by client nodes associated with the demand), and the weights assigned to each of the paths for each demand (e.g., in step 406). The traffic flowing in each link is the aggregate of the traffic flowing in each of the paths that traverse that link, and thus may comprise traffic from multiple demands. The measured traffic may be an average value, calculated over a defined time window.

As noted above, the weight assigned to path $P_k$ is indicated by $w_k$. A connectivity demand $d_{ij}$ sends a measured traffic $u(d_{ij})$. As a consequence, a path $P_k$ satisfying demand $d_{ij}$ carries traffic $u(p_k)=w_k \cdot u(d_{ij})$.

The traffic on a link $l_{ij}$ can be calculated as the sum of the usages of all paths crossing it plus the background traffic, $u(l)=\Sigma_{l_{ij}\in p_k}\mu(p_k)+bt_{ij}$. This traffic is also directly measured as stated above.

The utilization or load of a link $v(l_{ij})$ is a ratio between the traffic $u(l_{ij})$ flowing on that link and the capacity $c(l_{ij})$ of the link. As such, it is the amount of traffic on the link divided by the capacity of the link. Thus a link which is operating at full capacity (i.e. the amount of traffic flowing on the link is equal to the capacity of the link) has a utilization of 1 or unity.

According to some embodiments of the disclosure, the utilization can take values which are greater than 1, which is representative of a link that is overloaded, i.e. the traffic exceeds a full capacity of the link. Traffic which exceeds the capacity of the link may be held in a queue prior to transmission over the link, e.g. in a buffer.

To calculate the optimal weights, we first of all define the problem in such a way that it is well understood what is the desired status of the network that the calculation aims to achieve.

Some embodiments of the disclosure define a criticality of each link and use the criticality, instead of the utilization $v(l_{ij})$ of each link, to determine and adjust or determine the weight assigned to each path flowing through the network. Thus, in step 502, the management node calculates the criticality of each link $l_{ij}$ as a function of the utilization $v(l_{ij})$ of the link. Traffic routing is carried out on the basis of the calculated weight of each path of the network.

The criticality is a measure of the status of the link in dependence on the traffic flowing through that link. As said above, there is traffic crossing a link. While the traffic remains below the link capacity, the status of the link can be considered to be good. In some aspects, if the link has a low load, e.g. the link is at half capacity, the link can be considered as having a status which is slightly worse than if the link is completely empty, because there is a lower opportunity for future traffic accommodation. However, the network is still working without any negative effects, and thus the status of the link is not impaired as might be expected by the carrying of a substantial amount of traffic (e.g. half link capacity). The criticality value of the link is low at such moderate utilization levels, reflecting the low determined negative impact of the traffic.

When the traffic load approaches the link capacity, however, a negative impact on the ability of the link to carry the traffic is determined, and reflected in the determined criticality value. For example, as the traffic load approaches the link capacity, the queues begin to fill and/or initial congestion is experienced. Therefore, in a region close to the capacity of the link (e.g., between 0.8 and 1, or 80% and 100% utilization), the criticality is determined to rise sharply. Thus, the criticality reflects the impact of the traffic on a link/node, and not merely the amount of the traffic on the link/node.

In principle, the capacity of the link should not be exceeded, but the presence of queues (or buffers) allows some extra traffic to be absorbed for limited periods of time. Therefore, the criticality is defined for values of the utilization which are greater than unity, i.e. above nominal link/node capacity or over full capacity. This allows the network to route traffic on a link which is above the link (or node) maximum nominal capacity to carry traffic, if this is necessary. Further, for values of the utilization which are greater than unity, the criticality may take values which are below the maximum value of the criticality. In some aspects, the criticality has a minimum value at a first value of the utilization (e.g., a low value of utilization) and a maximum value at a second value of the utilization (e.g., a high value of utilization, greater than the first value). The second value of the utilization corresponds to a utilization which is over a full capacity of the link. As such, the criticality does not have a maximum value at a nominal maximum capacity of the link, but instead the criticality has a maximum value at a utilization which is above a nominal maximum (i.e. full) capacity of the link.

As such, for values of utilization above the link capacity, the link criticality continues to rise with increasing utilization. There is little capacity increase available through the use of queues, so the criticality values do not significantly increase further with additional utilization, seen as the criticality values flattening asymptotically towards the maximum value above full utilization. In other words, having the link overloaded at 150% or 200% of link capacity makes little difference. Between those example very high link utilizations, the criticality value will be at, or very near, its maximum.

Figure 6:
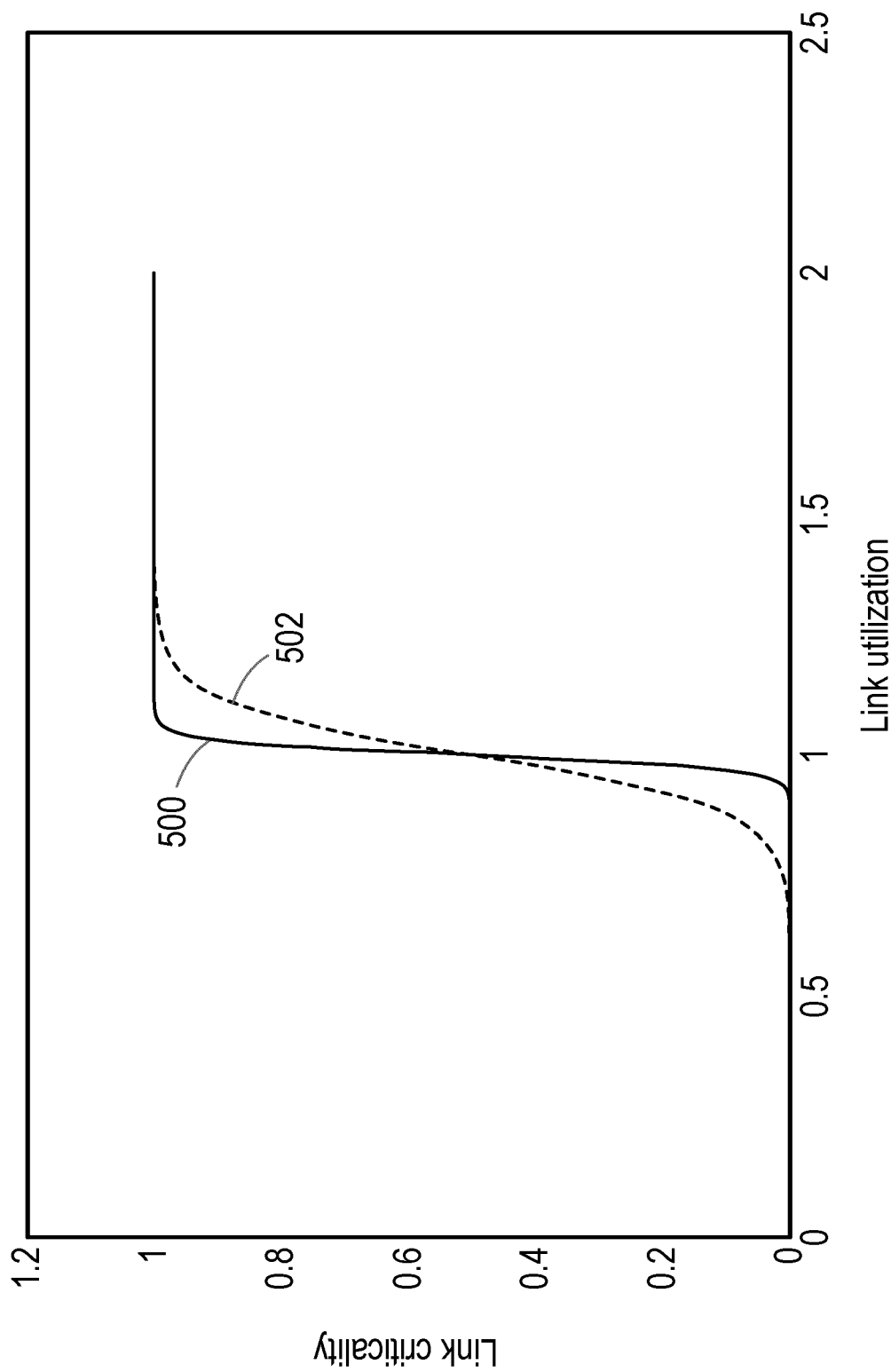
FIG. 6 is a graph showing the variation of link criticality with utilization according to embodiments of the disclosure.

FIG. 6 shows the variation of link criticality $s(l_{ij})$ with link utilization $v(l_{ij})$ according to an embodiment of the disclosure. Two functions are shown: a first function 600 and a second function 602.

Generally, determined criticality values increase as the utilization of the link (i.e. traffic load increases). For some ranges of the utilization the criticality may have a constant value (e.g. at low utilizations, e.g. below 50%). The determined criticality values, based the utilization by functions such as function 600, 602, provide for effective weighting of traffic routes so that traffic flow through the network is carried out effectively.

For both functions, as described above, it can be seen that the criticality varies, monotonically and with a non-constant gradient, between a minimum value and a maximum value as the link utilization increases. At low values of the utilization, the criticality varies with the utilization at a relatively low (or zero) gradient. In the illustrated embodiment, the criticality tends (asymptotically) towards its minimum value as the utilization approaches zero. Similarly, at high values of the utilization (above 1), the criticality also varies with the utilization at a relatively low (or zero) gradient. In the illustrated embodiment, the criticality tends (asymptotically) towards its maximum value as the utilization approaches infinity. In between those two regions, the criticality varies with the utilization at a relatively high gradient. In particular, the criticality increases with a relatively high gradient between utilization of around 0.8 (or 80%) and 1 (or 100%). This reflects the fact that the link rapidly moves from a situation in which operation of the link is normal (e.g., few or no packets experience additional delay), even at relatively high utilization, to one in which operation of the link is compromised (e.g., several or all packets experience additional delay) as the utilization approaches 1.

The above description can be mathematically quantified with an S-shaped or sigmoid function. The sigmoid function as a shape is well studied and those skilled in the art will appreciate that there are several functions with a sigmoid shape. The logistic function is one of the most common, defined as follows:

$$s = \frac{1}{1 + \exp(b \cdot (a - v))}$$

In this example, the criticality function s has two configurable parameters: the slope b and the intercept a. v is the link utilization, defined above. The slope determines how steep the curve is in proximity of the intercept, and the intercept determines where the gradient of the function is highest (e.g., the value of the utilization at which the criticality is equal to 0.5 in this specific example). The presence of one or more configurable parameters in the criticality function means that the determined criticality value can be tuned or optimized for a particular network or network type. Thus, for example, in an initial configuration phase, one or more configurable parameters can be determined which provide for the determined criticality values to accurately reflect the impact of traffic on the operation of the network. The functions 600 and 602 illustrated in FIG. 6 are both logistic functions. The function 600 has a slope of 70 and an intercept of 1. The function 602 has a slope of 18 and an intercept of 1.

Those skilled in the art will appreciate that the criticality may not be defined as a logistic V function. For example, alternative sigmoid functions may include $$s = \frac{v}{\sqrt{(1 + v^2)}}.$$

The criticality may also not be defined as a conventional S-shaped or sigmoid function. For example, the example functions given above and with respect to FIG. 6 are all smoothly varying and differentiable. The criticality function may be defined differently, for example as a series of straight line curves for different regions of the utilization. In such an example, the criticality may be defined for relatively low values of the utilization as a straight line varying with a low or zero gradient at or near its minimum value, and for relatively high values of the utilization as a straight line varying with a low or zero gradient at or near its maximum value. In between those two regions (e.g., at least between values of utilization of around 0.8 and around 1), the criticality may be defined as a straight line varying with a relatively high gradient.

In another example, values of the criticality may be defined in a look-up table, based on corresponding values of the utilization. The values of the criticality may be defined based on the utilization so as to approximate the functions described above.

The functions may comprise one or more parameters which are configurable by the network operators, e.g., to achieve a desired outcome or performance. For example, where the criticality varies as a logistic function of the utilization, one or more of the slope and the intercept may be configured by the network operator as desired. The intercept may be defined relatively low (e.g. a guard margin below 1) such that the traffic flowing in the link preferably never reaches capacity, or that the usage of queues and buffers is reduced. Alternatively, the intercept may be defined relatively high (e.g. above 1), if the network operator wishes to accommodate large amounts of traffic. Similarly, the slope can be made steeper (i.e. a higher gradient on a graph of criticality value on the vertical axis and link utilization on the horizontal axis) if the type of traffic transmitted over the network is particularly sensitive to latency.

In FIG. 6, the minimum values of the criticality are equal to or approach zero. According to an embodiment of the disclosure, however, the minimum value of the criticality (e.g., as the utilization approaches or is equal to zero) is non-zero. It will be understood from the discussion below that a link which has zero criticality is unlikely to effect the allocation of weights to paths through the network. A non-zero criticality, even at low values of utilization, allows the weights to be optimized even when relatively little traffic is flowing in the network. For example, an offset may be applied to the criticality at low values of the utilization, or the function may be defined such that the criticality is equal to or tends towards a non-zero value as the utilization approaches zero.

It will be further noted that if the same function were used regardless of link capacity, links with smaller capacity would not be discouraged over links with larger capacity in cases of equal utilization. However, the smaller link has less spare capacity than the larger link. In order to counteract this effect, the criticality may be normalized based on the capacity of the link.

For example, where the criticality is defined using the logistic function, the following normalization can be adopted:

$$s = \frac{1}{1 + \exp(b \cdot (a - v) \cdot c_i / c_{ref})}$$

where $c_i$ is the link capacity and $c_{ref}$ is a reference capacity for the whole network, e.g., the maximum or average link capacity. The effect of this normalization is to make the slope of the function less steep for the links with lower capacity (particularly in the vicinity of the intercept), and thus the criticality of a lower-capacity link lies above the criticality of a higher-capacity link at utilizations below the intercept, and beneath the criticality of the higher-capacity link at utilizations above the intercept.

One aim of the method of FIG. 5 may be to minimize the sum of the link criticalities in the network.

In step 504, the management node determines the path criticality for each path, for each demand. The path criticality may be defined as a sum of the criticalities of each link which the path crosses. Thus the output of step 504 is a set of path criticalities for each demand, the set of path criticalities comprising a path criticality for each path defined for the demand.

In step 506, the management node determines the improvability of each demand. The improvability relates to the amount by which the path criticalities of the paths for each demand can be improved or equalized, so that no path is more critical than another path for a given demand. In one embodiment, the demand improvability for a particular demand is defined as the difference in criticality between the path for the demand having non-zero weight and maximum criticality, and the path for the demand having minimum criticality. Thus the output of step 506 is an improvability value for each demand.

The method then proceeds to evaluate stopping criteria and performance improvements, which are relevant only when the method is performed iteratively. For the purposes of this description, we assume that the stopping criteria are not met for a first iteration of the method, and thus the description of the method now moves to step 516, in which the demand with the maximum improvability is selected. In step 518, the weights for the paths of that selected demand are adjusted so as to decrease the improvability for that demand. One method of achieving that improvement is to reduce the weight for the path having the highest criticality (and non-zero weight) by a certain amount or step size, and to increase the weight for the path having the lowest criticality by the same amount or step size. The amount by which the weights are adjusted may vary as a function of the traffic for that demand. For example, the amount varies inversely proportionally to the traffic for the demand. The amount may be defined as:

$$\min(w(cp(d_{max})), \text{sensitivity}*\text{impr}/u(d_{max}))$$

So the amount is the minimum of the weight for the most critical path ($cp(d_{max})$), and the improvability for the demand divided by the traffic for the demand, multiplied by a constant sensitivity. The minimum function is present so that the weight is not reduced below zero. $d_{max}$ is the demand having highest improvability.

As the improvability is defined as the difference in criticality between these two paths, the improvability of the selected demand should decrease.

In the illustrated embodiment, the method is iterative, and thus the method moves from step 518 back to step 500, in which the traffic flowing in each link is measured again. In iterations which are subsequent to the first iteration (as here), this step may involve the calculation of the traffic flowing in each link based on the previously measured values and the changes to the weights made in step 518, rather than re-measurement of the traffic flowing in all links of the network.

In steps 502, 504 and 506, the criticality of the links of the network, the path criticalities, and the improvabilities of the demands are re-calculated.

In step 508 (description of which was omitted above for the first iteration), the management node determines whether a stopping criterion has been reached. For example, one stopping criterion may be a maximum number of iterations. This embodiment may be particularly suited for networks in which the amount of traffic flowing for each demand, or the background traffic, varies relatively rapidly. Thus, particularly where link traffic is not re-measured for subsequent iterations, the method stops when the maximum number of iterations is reached, and before the amount of traffic flowing in the network changes significantly. In another embodiment, the stopping criterion may comprise a determination that the highest improvability for all demands in the network is below a threshold. In this latter embodiment, the method stops when the criticality of all paths for each demand have been equalized, such that one path is not significantly more critical than another path for the same demand.

In the event that the stopping criterion is reached, the method ends in step 510. If the weights have not yet been output for implementation in the network, the weights are output from the management node to the network, such that traffic for each demand can be routed through the network in accordance with the weights.

If the stopping criterion has not been reached, the method proceeds to step 512, in which the management node determines whether the adjustment to the weights made in step 518 resulted in an increase to the highest value of improvability of the demands in the network. For example, in a previous iteration, suppose that the improvability of Demand A is 0.78, and that the improvability of Demand B is 0.7. Demand A is therefore selected and the weights of its paths adjusted in step 518. This reduces the improvability of Demand A to 0.6, but increases the improvability of Demand B to 0.84. The maximum improvability across the network has actually increased as a result of the changes made in step 518. If the maximum improvability has increased, the method proceeds to step 514, in which the step size (the amount by which the weights are adjusted in step 518) is attenuated. For example, the constant sensitivity, defined above, may be attenuated. The attenuation may be implemented by multiplying the constant by an attenuation factor, which is a positive number less than 1 (such that the step size cannot be negative). The attenuated step size is then used in step 518 to adjust the weights of the demand having highest improvability. If the maximum improvability has not increased (as determined in step 512), the step size is not attenuated, and the method proceeds directly to steps 516 and 518.

It will be noted that, in embodiments where the minimum value of the criticality is non-zero but the gradient of the criticality is zero (i.e. flat) as the utilization approaches zero, when the load in the network is low the path criticality for each path will correspond to the non-zero value multiplied by the number of links that the path traverses. Thus longer paths will have higher criticality than shorter paths. In such embodiments, the method may alter the weights so as to increase the weights for shorter paths and lower the weights for longer paths. At low network load, this approaches a shortest path allocation.

In embodiments where the criticality varies with a non-zero gradient as the utilization approaches zero, even when the load in the network is low, the criticality for each path is dependent on the utilization of each link that the path traverses. In this embodiment, the weights for shorter paths may again be increased while the weights for longer paths may be decreased; however, a greater proportion of traffic may be allocated to longer paths than in the case where the gradient of the criticality is zero as the utilization approaches zero. The value of the gradient of the criticality as the utilization approaches zero may be configured or tuned so as to achieve a desired performance at low network load.

Thus the disclosure provides a simple heuristic method by which an empirical definition of network improvability is given and the weights are changed pairwise to simplify the procedure.

Figure 7:
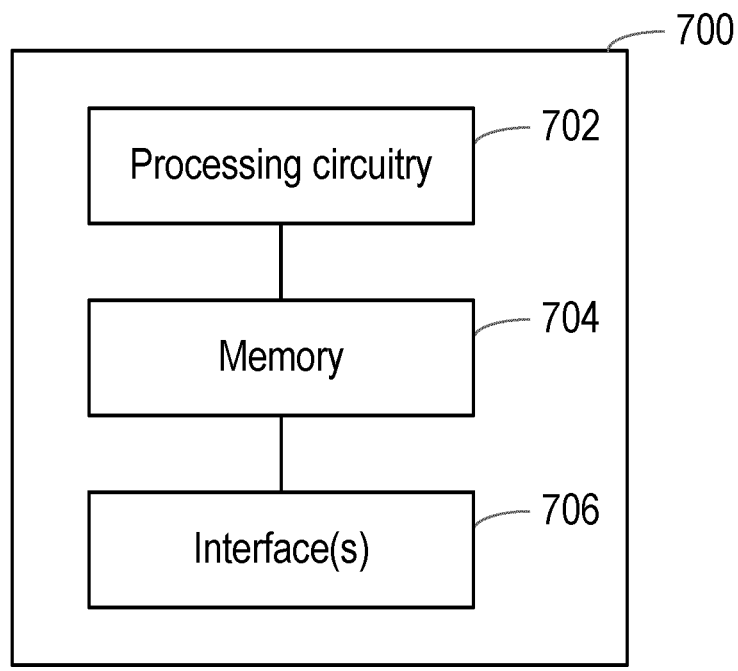
FIG. 7 is a schematic diagram of a network management node according to embodiments of the disclosure.

FIG. 7 is a schematic diagram of a network management node 700 according to embodiments of the disclosure. The network management node 700 may be operable as the management node 206 shown in FIG. 2 or the management node 300 shown in FIG. 3a or 3b, for example. The network management node 700 may be operable to perform the methods according to FIGS. 4 and 5.

The network management node 700 comprises processing circuitry 702 and a non-transitory machine-readable medium (such as memory) 704.

The machine-readable medium 704 stores instructions which, when executed by the processing circuitry 702, cause the network node 700 to: obtain traffic information for a plurality of demands for connectivity from client nodes through the mobile transport network, the traffic information for each demand identifying a client node for the demand, an egress node for the demand and an amount of traffic for the demand; calculate, for each demand, one or more paths from the client node, via an ingress node, to the egress node through the mobile transport network; map each path for a demand to a source port in the ingress node for the demand; provide the mapping to the ingress nodes to enable routing of traffic pertaining to the demands via the paths, based on the source port; and provide the source ports to the client nodes for inclusion in traffic pertaining to the demands.

The management network node 700 may further comprise one or more interfaces 706, providing interfaces for the transmission and/or reception of signals via any suitable modality. For example, the interfaces 706 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The processing circuitry 702, machine-readable medium 704 and interfaces 706 may be coupled to each other in any suitable manner. For example, although FIG. 7 shows the components coupled together in series, it will be understood by those skilled in the art that the components may be coupled together in an alternative manner, such as via a bus.

The network management node 700 may alternatively be defined in terms of hardware and/or software modules configured to perform the steps of the methods described herein. For example, the network management node 700 may alternatively or additionally comprise: an obtaining module configured to obtain traffic information for a plurality of demands for connectivity from client nodes through the mobile transport network, the traffic information for each demand identifying a client node for the demand, an egress node for the demand and an amount of traffic for the demand; a calculating module configured to calculate, for each demand, one or more paths from the client node, via an ingress node, to the egress node through the mobile transport network; a mapping module configured to map each path for a demand to a source port in the ingress node for the demand; and a providing module configured to provide the mapping to the ingress nodes to enable routing of traffic pertaining to the demands via the paths, based on the source port, and to provide the source ports to the client nodes for inclusion in traffic pertaining to the demands.

As used herein, the term 'module' shall be used to at least refer to a functional unit or block of an apparatus or device. The functional unit or block may be implemented at least partly by dedicated hardware components such as custom defined circuitry and/or at least partly be implemented by one or more software processors or appropriate code running on a suitable general purpose processor or the like. In one embodiment, the modules are defined purely in hardware. In another embodiment, the modules are defined purely by software. A module may itself comprise other modules or functional units.

This software code may be stored in the device as firmware on some non-volatile memory e.g. EEPROM (to preserve program data when the battery becomes discharged or is removed for replacement).

Embodiments of the present disclosure thus provide apparatus, computer program products and methods for allocating traffic in a telecommunications network.

It should be understood—especially by those having ordinary skill in the art with the benefit of this disclosure—that that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

The invention claimed is:

1. A method performed by a network controller for a mobile transport network, the method comprising:

obtaining traffic information for a plurality of demands for connectivity from client nodes through the mobile transport network, the traffic information for each demand identifying a client node for the demand, an egress node for the demand and an amount of traffic for the demand;

calculating, for each demand, one or more paths from the client node, via an ingress node, to the egress node through the mobile transport network;

mapping each path for a demand to a source port in the ingress node for the demand;

providing the mapping to the ingress nodes to enable routing of traffic pertaining to the demands via the paths, based on the source port;

providing the source ports to the client nodes for inclusion in traffic pertaining to the demands;

performing a global optimization algorithm, having as input a lists of possible paths for the plurality of demands and the amount of traffic for the plurality of demands;

determining weights for the assignment of traffic to the one or more paths for each demand, the determination of weights comprising optimizing a global network performance parameter related to rates of traffic flowing on links of the mobile transport network, and capacities of the links of the mobile transport network;

each link in the mobile transport network having a capacity, and one of the following applies: the optimization algorithm seeks to minimize the globally highest ratio of traffic usage to capacity for a link; and the optimization algorithm seeks to minimize a sum of the square of a ratio of traffic usage to capacity for the links; and providing the weights to the client nodes to enable assignment of traffic by the client nodes to the one or more paths for each demand.

2. The method according to claim 1, further comprising:
mapping microflows for each demand to source ports based on the weights and the mapping between paths and source ports; and
providing the mapping of microflows to source ports to the client nodes.

3. The method according to claim 1, wherein each demand comprises a plurality of microflows, and wherein the weights and the mapping enable the allocation of microflows to paths for the demand according to the weights.

4. The method according to claim 3, wherein multiple microflows are allocated to the same path.

5. The method according to claim 1, wherein the amount of traffic for the demand comprises a predicted amount of traffic for the demand.

6. The method according to claim 1, wherein the amount of traffic for the demand comprises a measured amount of traffic rate for the demand.

7. The method according to claim 1, further comprising:
obtaining topology information for the mobile transport network, the topology information identifying a plurality of nodes of the mobile transport network, a plurality of links between nodes of the mobile transport network, and a capacity of the nodes and/or links to handle traffic, and
wherein calculation of the one or more paths comprises calculating the one or more paths based on the topology information.

8. The method according to claim 1, further comprising obtaining constraint information for the plurality of demands, and wherein calculation of the one or more paths comprises calculating the one or more paths based on the constraint information.

9. The method according to claim 1, wherein the mobile transport network provides a GPRS Tunnelling Protocol, GTP, based interface between nodes of a communication network.

10. The method according to claim 1, wherein the mobile transport network comprises a backhaul network.

11. The method according to claim 1, wherein the source port is a User Datagram Protocol, UDP or a Transmission Control Protocol, TCP, port.

12. A network controller for a mobile transport network, the network controller comprising processing circuitry and a non-transitory machine-readable medium storing instructions which, when executed by the processing circuitry, cause the network controller to:
obtain traffic information for a plurality of demands for connectivity from client nodes through the mobile transport network, the traffic information for each demand identifying a client node for the demand, an egress node for the demand and an amount of traffic for the demand;
calculate, for each demand, one or more paths from the client node, via an ingress node, to the egress node through the mobile transport network;
map each path for a demand to a source port in the ingress node for the demand;
provide the mapping to the ingress nodes to enable routing of traffic pertaining to the demands via the paths, based on the source port;
provide the source ports to the client nodes for inclusion in traffic pertaining to the demands;
perform a global optimization algorithm, having as input a lists of possible paths for the plurality of demands and the amount of traffic for the plurality of demands;
determine weights for the assignment of traffic to the one or more paths for each demand, the determination of weights comprising optimizing a global network performance parameter related to rates of traffic flowing on links of the mobile transport network, and capacities of the links of the mobile transport network;
each link in the mobile transport network having a capacity, and one of the following applies: the optimization algorithm seeks to minimize the globally highest ratio of traffic usage to capacity for a link; and the optimization algorithm seeks to minimize a sum of the square of a ratio of traffic usage to capacity for the links; and
provide the weights to the client nodes to enable assignment of traffic by the client nodes to the one or more paths for each demand.

13. The network controller according to claim 12, wherein the network controller is further caused to:
map microflows for each demand to source ports based on the weights and the mapping between paths and source ports; and
provide the mapping of microflows to source ports to the client nodes.

14. A computer program comprising instructions which, when executed on at least one processor, cause the at least one processor to carry out a method, the method comprising:
obtaining traffic information for a plurality of demands for connectivity from client nodes through a mobile transport network, the traffic information for each demand identifying a client node for the demand, an egress node for the demand and an amount of traffic for the demand;
calculating, for each demand, one or more paths from the client node, via an ingress node, to the egress node through the mobile transport network;
mapping each path for a demand to a source port in the ingress node for the demand;
providing the mapping to the ingress nodes to enable routing of traffic pertaining to the demands via the paths, based on the source port;
providing the source ports to the client nodes for inclusion in traffic pertaining to the demands;
performing a global optimization algorithm, having as input a lists of possible paths for the plurality of demands and the amount of traffic for the plurality of demands;
determining weights for the assignment of traffic to the one or more paths for each demand, the determination of weights comprising optimizing a global network performance parameter related to rates of traffic flowing on links of the mobile transport network, and capacities of the links of the mobile transport network;
each link in the mobile transport network having a capacity, and one of the following applies: the optimization algorithm seeks to minimize the globally highest ratio of traffic usage to capacity for a link; and the optimization algorithm seeks to minimize a sum of the square of a ratio of traffic usage to capacity for the links; and
providing the weights to the client nodes to enable assignment of traffic by the client nodes to the one or more paths for each demand.

* * * * *